Jan. 24, 1939. G. V. KELLER, JR 2,145,117
SPEED GOVERNING MECHANISM
Filed Aug. 31, 1937
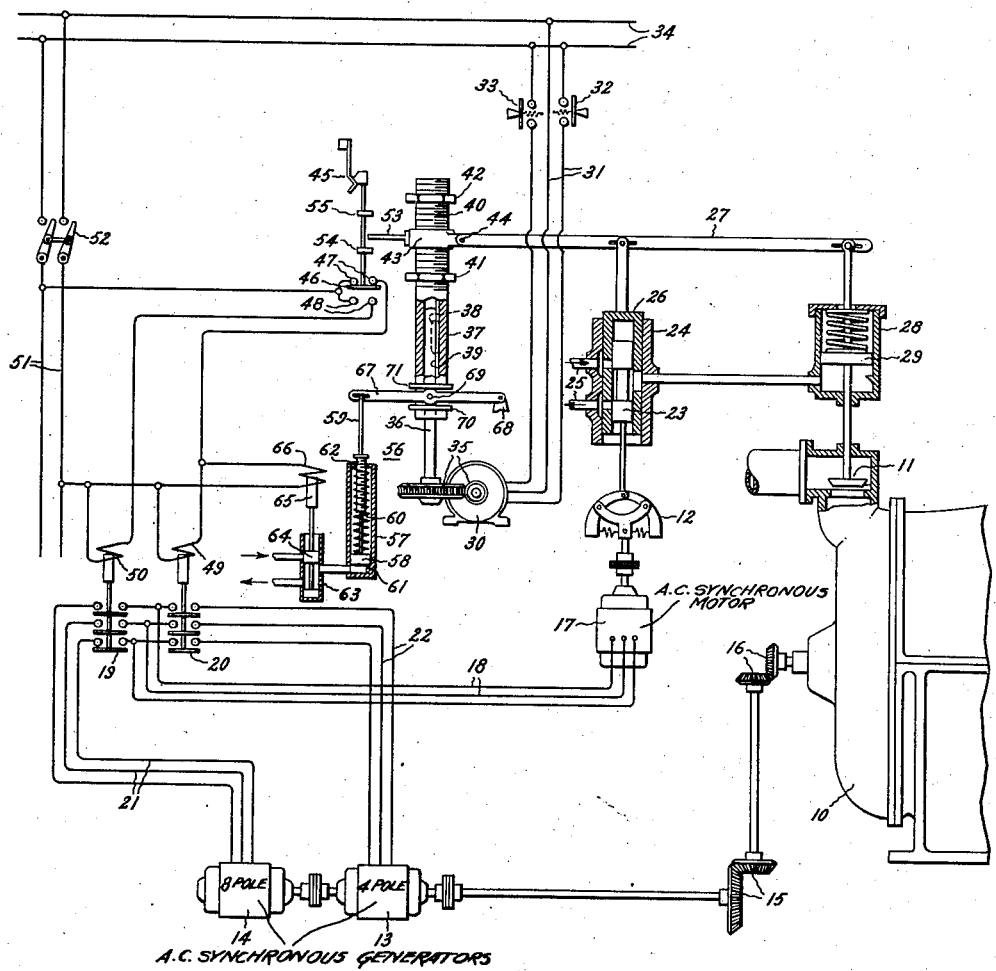
Inventor:
George V. Keller Jr,
by Harry E. Dunham.
His Attorney.

Patented Jan. 24, 1939

2,145,117

UNITED STATES PATENT OFFICE 2,145,117

SPEED-GOVERNING MECHANISM

George V. Keller, Jr., Lynn, Mass., assignor to General Electric Company, a corporation of New York Application August 31, 1937, Serial No. 161,765

10 Claims. (Cl. 264—2)

The present invention relates to speed-governing mechanisms for controlling an engine or prime mover within a wide range of speed. As the speed range of a governor is limited, it becomes at times necessary to provide between such governor and the engine or prime mover to be controlled a variable speed-gearing or speed changing device whereby for instance the speed of the prime mover may be varied within a range of 1:10 or more for a range of governor speed of 1:3 only. The gearing between the prime mover shaft and the governor may be of any known mechanical type or it may be in the form of an electrical gearing as disclosed in the co-pending application of S. N. Hedman, Serial No. 55,263, filed December 19, 1935, and assigned to the same assignee as the present application. Whenever the speed-varying means between the prime mover shaft and the speed governor is of a type which does not permit gradual variation of the speed-transmission ratio, the elements actuated by the speed governor are subject to considerable changes of their position whenever the speed-transmission ratio between the prime mover shaft and the governor is changed.

The object of my invention is to provide an improved construction and arrangement of speed-governing mechanisms in which means are provided for minimizing undesirable effects of changes of the speed-transmission ratio of the variable speed-gearing between the prime mover shaft and the governor. This is accomplished by my invention by the provision of means for automatically positioning certain elements of the speed-governing mechanism such as a follow-up lever in response to changes of the speed-transmission ratio of the variable speed-gearing between the speed governor and the prime mover shaft.

For a consideration of what I believe to be novel and my invention, attention is directed to the following description and the claims appended thereto in connection with the accompanying drawing.

The single figure of the drawing shows a simplified diagrammatic view of an arrangement embodying my invention.

The arrangement of the drawing comprises an elastic fluid turbine 10 having an inlet valve 11 for controlling the flow of elastic fluid thereto and a governing mechanism including a centrifugal type speed governor 12 for controlling the inlet valve in response to speed changes. This type of governor ordinarily permits accurate control of the valve within a speed range of about 1:3. Thus, it may accurately control the turbine at speeds of from 500 to 1500 R. P. M. In order to permit a wider speed range for the turbine, a variable speed-gearing is provided between the turbine shaft and the governor 12 so that the turbine may be operated and accurately controlled at speeds of from 500 to 5000 R. P. M. or more while the speed range of the governor will remain between 500 to 1500 R. P. M. This variable speed-gearing in the present instance has been shown in the form of an electrical gearing comprising a 4-pole A. C. synchonous generator 13 and an 8-pole synchronous A. C. generator 14, both driven through a gearing 15, 16 from the turbine shaft. The governor 12 is driven by an A. C. synchronous motor 17 which may be connected by an electric circuit including a conductor 18 and switches 19 and 20 to the conductors 21 and 22 of the generators 13, 14. During low speed operation of the turbine 10 the switch 19 is closed to connect the 8-pole generator 14 to the motor 17, and during high speed operation of the turbine 10 the switch 20 is closed to connect the 4-pole generator 13 to the governor motor 17. The arrangement as will be described hereinafter is such that only one of the switches 19, 20 will be closed at a time so that the motor 17 is connected either by the switch 19 to the 8-pole generator 14 or by the switch 20 to the 4-pole generator 13. The governor 12 is connected to the valve heads 23 of a pilot valve 24, which latter has inlet and outlet ports 25 and a bushing 26 connected to an intermediate point of a governor lever 27. The pilot valve 24 serves to control the flow of actuating fluid to a hydraulic motor 28 which has a piston 29 with a stem connected to the right-hand end of the lever 27. An extension of the stem is connected to the valve 11. Assuming that the left-hand end of the lever 27 is fulcrumed, then during operation an increase in speed causes downward movement of the pilot valve head 23 whereby operating fluid is discharged from the hydraulic motor 28, thus permitting downward movement of the piston 29 and closing of the valve 11. This movement causes through the lever 27 downward movement of the bushing 26 whereby the neutral position of the pilot valve 24 is restored. Similarly, a decrease in speed causes opening of the valve 11 with the various elements moving in a direction opposite to that described hereinbefore.

The operation so far described is that of any ordinary governing mechanism. Let us assume that the switch 20 is closed so that the governor motor 17 is energized from the 4-pole generator 14. If under such a condition the speed of the turbine and accordingly the governor reaches a certain value, it becomes necessary to open the switch 20 and to close the switch 19, that is, change the speed-transmission ratio of the electrical variable speed gearing. Such abrupt change of the speed transmission ratio ordinarily effects a sudden change in position of the pilot valve 23. This may lead to temporary undesirable speed changes of the turbine. This drawback is overcome in accordance with my invention by the provision of means for positioning the left-hand end of the governor lever 27 in response to changes in speed-transmission ratio of the variable speed-gearing. These means are combined with a remote control mechanism for remotely setting the speed of the turbine. This speed-setting mechanism comprises a reversing motor 30 connected by conductors 31 and push-buttons 32, 33 to an electric line 34. Closing of the push-button 32 causes rotation of the motor 30 in one direction and closing of the push-button 33 causes operation of the motor in the reverse direction. Rotation of the motor is transmitted by a worm gearing 35 to a spindle 36. The upper portion of the spindle 36 is surrounded by a sleeve 37. The arrangement is such that rotation of the spindle 36 causes rotation of the sleeve 37. At the same time the sleeve 37 may be moved axially up or down without affecting the spindle 36. To this end a key 38 is secured to the spindle 36 and projects into a keyway 39 in the inner surface of the sleeve 37. If the sleeve is moved up and down, the key 38 remaining in position slides relatively along the keyway 39. However, rotation of the spindle 36 is positively transmitted through the key 38 to the sleeve 37. The upper portion of the sleeve has a screw-thread 40, a lower stop 41 and an upper stop 42. A nut 43 is screwed on to the thread 40 and connected by a pivot 44 to the left-hand end of the governor lever 27.

With this arrangement, closing of one of the push-buttons 32, 33 causes through the motor 30 rotation of the sleeve 37 whereby the nut 43 travels up or down, depending upon which push-button is closed. Thus, if it is desired to increase the speed of the turbine, one of the push-buttons is closed to effect downward movement of the nut 43 whereby the left-hand end of the lever 27 and accordingly the pilot valve bushing 26 are moved downward, thus permitting the flow of operating fluid under pressure through the inlet port 25 of the pilot valve to the hydraulic motor 28, resulting in opening movement of the turbine inlet valve 11. Thus, in this particular arrangement, the positioning of the nut 43, that is, the left-hand end of the lever 27 causes a change in turbine speed. The movement of the nut 43 is utilized to effect a change in the speed-transmission ratio of the electrical variable gearing 13, 14, 17. More specifically, means are provided for automatically changing said ratio as the nut 43 reaches certain end positions. In the present example, this means comprises a snapswitch 45 having a contact-making member 46 which in the position indicated bridges two contacts 47 and which in the other position bridges two contacts 48. The contacts 47 serve to close the circuit of a solenoid 49 for holding the switch 20 closed while the contacts 48 serve to close a circuit for a solenoid 50 for holding the switch 19 closed. Both circuits are connected to line conductors 51 which in turn are connected by a switch 52 to the line 34. In the present instance closing of the switch 52 effects energization of the relay 49 and thus closing of the switch 20 to connect the generator 13 to the motor 17. If the snapswitch is moved downward to close contacts 48, the switch 19 will be closed and the switch 20 opened. Positioning of the snapswitch is effected by means including an actuating member 53 in the form of an arm rigidly secured to the nut 43 and stops 54 and 55 secured to the stem of the contact-making member 46 and cooperatively associated with the arm 53. Thus, downward movement of the nut 43 in the present instance in a certain position of the nut will effect reversing of the snapswitch position. Thus, a change of the speed-transmission ratio of the electrical variable speed-gearing 13, 14, 17 is automatically effected as the speed, more specifically the position of the nut 43, reaches certain limits. As stated above, means are provided whereby the position of the governor lever 27, more specifically the nut 43, is automatically changed or adjusted upon a change in speed-transmission ratio of the electrical gearing. This means comprises a hydraulic motor 56 having a casing 57 with a piston 58 connected to a stem 59. The piston is biased in downward direction by a spring 60. The lower end position of the piston is determined by a stop 61 and the upper end position of the piston is determined by a stop in the form of an adjustable sleeve 62 screwed into the upper end of the cylinder 57. Actuating fluid under pressure, such as oil, may be conducted into the lower end of the cylinder 57 by a pilot valve 63 having a valve head 64 connected to a solenoid 65 which latter has a coil 66 connected in parallel to the coil of the solenoid 49. Thus, whenever solenoid 49 is energized and the switch 20 closed, the coil 66 of the solenoid 65 is energized to hold the pilot valve head 64 in an upper position in which actuating fluid under pressure is supplied to the cylinder 57 to force the piston 58 into its upper end position, that is, into contact with the stop 62 and vice-versa, whenever solenoid 49 is disconnected the solenoid 65 is de-energized and the pilot valve head 64 moved into a position in which actuating fluid in the cylinder 57 is drained and thereby the piston 58 moved into its lower end position to engage the stop 61.

The upper end of the hydraulic motor stem 59 is pivoted to the left-hand end of a lever 67, which latter has a right-hand end supported on a fulcrum 68 and an intermediate portion 69 disposed between two rings 70 and 71 secured to and forming part of the sleeve 37. With this arrangement, upward movement of the piston 58 causes upward turning of the lever 67 whereby the sleeve 37 together with the nut 43 are moved into an upper end position and vice-versa, downward movement of the piston 58 of the hydraulic motor causes downward movement of the sleeve 37 into a lower end position. Thus, with my invention setting of the speed of the turbine or prime mover causes upon reaching of a certain speed automatic change of the speed-transmission ratio of the gearing between the prime mover and the governor and simultaneously automatic setting of the governor lever.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A speed-governing mechanism including the combination of a speed governor, a variable speed gearing for driving the governor, means actuated by the governor for positioning an element to be controlled, and other means for adjusting the last-named means to reduce movement of such element in response to any abrupt change in speed-transmission ratio of the variable speed gearing.

2. A speed-governing mechanism including the combination of a speed governor, variable speed-changing means for driving the governor from an engine to be controlled, means for transmitting movement from the governor to an element of such engine, and means for automatically adjusting the last-named means to reduce movement of such engine element in response to any abrupt change of speed ratio of the variable speed-changing means.

3. A speed-governing mechanism including the combination of a governor, a variable speed gearing for driving the governor from an engine to be controlled, means including a pilot valve positioned by the governor and a hydraulic motor controlled by the pilot valve for positioning an engine element in response to speed changes, and auxiliary means for positioning the last-named means to reduce movement of such engine element in response to abrupt changes of the ratio of the variable speed gearing.

4. A speed-governing mechanism including the combination of a speed governor, variable speed gearing for driving the governor from an engine to be controlled, a pilot valve positioned by the governor, a hydraulic motor controlled by the pilot valve for positioning an engine element to be controlled, a follow-up lever connecting the pilot valve to the motor, and means for automatically positioning the lever in response to changes of the speed ratio of the variable speed gearing.

5. A speed-governing mechanism including the combination of a speed governor, electrical motor means for driving the governor, electrical generator means responsive to speed changes of an engine to be controlled for energizing the motor means, an electric circuit for the generator and motor means including switching elements for varying the relative speed between the generator and motor means, means including a pilot valve and a follow-up lever for transmitting motion from the speed governor to an element to be controlled, and means for automatically adjusting the position of the lever in response to changes of the speed ratio between the generator and motor means.

6. A speed-governing mechanism including the combination of a speed governor, electrical motor means for driving the governor, electrical generator means responsive to speed changes of an engine to be controlled for energizing the motor means, an electric circuit for the generator and motor means including switching elements for varying the speed ratio between the generator and motor means, means including a pilot valve and a follow-up lever for transmitting motion from the speed governor to an engine element to be controlled, remote control means for adjusting the lever, and other means for adjusting the lever in response to variation of the speed ratio between the generator and motor means by actuation of the switching means.

7. A speed-governing mechanism including the combination of a speed governor, electrical motor means for driving the governor, electrical generator means responsive to speed changes of an engine to be controlled for energizing the motor means, an electric circuit for the generator and motor means including switching elements for varying the speed ratio between the generator and motor means, means including a pilot valve and a follow-up lever for transmitting motion from the speed governor to an engine element to be controlled, remote control means for adjusting the lever, and other means actuated in response to setting of the lever by the remote control means to change the relative speed between the generator and motor means.

8. A speed-governing mechanism including the combination of a speed governor, electrical motor means for driving the governor, electrical generator means responsive to speed changes of an engine to be controlled for energizing the motor means, an electric circuit for the generator and motor means including switching elements for varying the speed ratio between the generator and motor means, means including a pilot valve and a follow-up lever for transmitting motion from the speed governor to an element to be controlled, remote control means for adjusting the lever, other means actuated in response to setting of the lever by the remote control means to change the speed ratio between the generator and motor means, and auxiliary means interconnected with the last-named means to reduce movement of the pilot valve in response to a change of the speed ratio between the generator and motor means.

9. A speed-governing mechanism including the combination of a governor, a variable speed gearing for driving the governor from an engine to be controlled, means including a pilot valve connected to the governor and a lever connected to the pilot valve for positioning an engine element to be controlled, remote control means connected to the lever for remotely controlling the engine speed, means associated with the lever for changing the speed ratio of the variable gearing as the lever reaches a certain position, and means interconnected with the last-named means for positioning the lever upon a change of the speed ratio of the variable speed gearing.

10. A speed-governing mechanism including the combination of a governor, a variable speed gearing for driving the governor from an engine to be controlled, means including a pilot valve connected to the governor and a lever connected to the pilot valve for positioning an engine element to be controlled, means for remotely controlling the engine speed comprising a reversing motor, a spindle driven from the reversing motor, a sleeve surrounding the spindle and a key between the spindle and the sleeve to effect rotation of the sleeve in response to rotation of the spindle and to permit relative axial movement between the spindle and the sleeve, a nut member threaded onto the sleeve and connected to the lever, means for automatically changing the speed ratio as the nut member reaches a certain position, and means for automatically positioning the lever in response to a change of speed ratio, said last-named means comprising a lever connected to the sleeve to slide the sleeve axially with reference to the spindle and motor means for moving the last-named lever.

GEORGE V. KELLER, Jr.